United States Patent [19]
Patton
[11] Patent Number: 4,476,949
[45] Date of Patent: Oct. 16, 1984

[54] MOTORIZED WHEELCHAIR AND MEANS FOR STEERING THE SAME

[76] Inventor: Albert L. Patton, 46976 W. Bursley Rd., Wellington, Ohio 44090

[21] Appl. No.: 372,964
[22] Filed: Apr. 29, 1982
[51] Int. Cl.$^3$ .......... B60K 1/00
[52] U.S. Cl. .......... 180/65.1; 74/471 XY; 180/333; 180/907
[58] Field of Search .......... 180/65 R, DIG. 3, 333; 74/471 XY; 200/6 A

[56] References Cited

U.S. PATENT DOCUMENTS

| | | | |
|---|---|---|---|
| 2,544,831 | 3/1951 | Guyton | 180/333 |
| 2,586,273 | 2/1952 | Steven | 180/DIG. 3 |
| 3,530,951 | 9/1970 | Beig | 180/333 |
| 4,020,916 | 5/1977 | Noble | 180/65 R |
| 4,151,892 | 5/1979 | Francken | 180/333 |

OTHER PUBLICATIONS

J. C. Whitney Cataloge No. 385 B, Copywright 1979, "Dual Voltage Switch" p. 133.

*Primary Examiner*—Joseph F. Peters
*Assistant Examiner*—Joseph McCarthy
*Attorney, Agent, or Firm*—Oldham, Oldham, Hudak, Weber & Sand Co.

[57] ABSTRACT

A motorized wheelchair containing a novel steering mechanism which is operable using only low effort by the user. The wheelchair is rugged in design, and very maneuverable thus permitting use both indoors and out-of-doors. The design enables the user to overcome obstacles commonly encountered in use out-of-doors. The device incorporates a single joy stick to control steering while also selectably regulating between forward and reverse direction of motivation.

9 Claims, 12 Drawing Figures

MOTORIZED WHEELCHAIR AND MEANS FOR STEERING THE SAME

TECHNICAL FIELD

The invention herein lies in the art of motorized wheelchairs. Specifically, the invention relates to a device wherein the forward and reverse direction as well as the steering of the wheelchair are controlled through the use of a single joy stick. The device employs a novel means for directional control which significantly improves reliability over the prior art. The wheelchair is designed for both indoor and outdoor use and can attain speeds up to nine miles per hour.

BACKGROUND ART

There have heretofore been developed in the art a great many devices designed to increase the mobility of those persons having one or more of a variety of physical handicaps. In that this area of endeavor is highly populated with invention attests both to the great demand for such devices and to the fact that the known art has been unable to satisfy in all respects this demand.

Known motorized wheelchairs may be generally divided into two categories. One includes those devices which are motorized versions of conventional, collapsible wheel chairs and which have a battery powered motor driving each of the two large rear wheels. The steering, and forward and reverse directions are controlled by a single joy stick which electronically governs the speed of each motor driven wheel and thereby allows directional change by varying the relative speed of each wheel. This wheelchair type is generally restricted to indoor use.

Two problems are associated with this design. First, because of the sophisticated electronics involved, the electric motors and control mechanism are subject to frequent breakdown and subsequent costly repair. Indeed, maintenance of these parts constitutes the overwhelming percentage of the costs associated with their use, not to mention the high initial cost of such a wheelchair.

In addition to the above, there is also the problem of wear and tear on domestic carpeting and other floor coverings. Because movement in the home often requires tight maneuvering, the wheelchair must be able to pivot on one wheel, that is, one wheel is held stationary, while the other is rotated. Many wheelchairs rely solely on this method for directional control. This steering means however, causes severe wearing of the floor covering at the point of pivot which is aggravated by the fact that very narrow diameter tires are required to facilitate the pivot action. A great deal of pressure is thereby centered at the pivot point which can fray carpeting and remove finishes on wood or vinyl flooring.

A second category of motorized wheelchairs comprises the devices generally used out-of-doors. These wheelchairs are somewhat akin to golf carts or go-carts in their manner of operation in that they generally possess a conventional front wheel steering mechanism and rear drive. This layout, although much less maneuverable than the first said design, is much simpler and more rugged and thus better adapted to the more demanding environment out-of-doors. Of course the lack of high maneuverability precludes use indoors except in large open spaces such as a factory or office. Included also in this category are those devices which can accept a conventional, unmotorized wheelchair much like an overland ferry boat. That is, the wheelchair is loaded onto a platform and the occupant drives the device using the wheelchair as a driver's seat. Both of these types of outdoor wheelchairs have the disadvantage that their steering and/or forward and reverse controls require a higher degree of effort to use than the electric means generally used in the indoor type wheelchair.

Heretofore, no one has devised a control mechanism which is both very simple and very rugged in design and yet can be operated by low effort joy stick control. Thus, outdoor wheelchairs of the known art are inappropriate for those really handicapped persons who are unable to exert effort to use the controls.

The prior art includes the following references: U.S. Pat. No. 3,921,740 teaches use of a loading ramp to facilitate movement of a wheelchair onto the floor at the rear of the device; U.S. Pat. No. 3,912,032 concerns use of a tractor assembly to interconnect with a wheelchair providing power therefore; U.S. Pat. No. 2,710,659 teaches use of a tractor unit to be attached to a wheelchair to produce a cart; U.S. Pat. No. 806,295 teaches the use of an electric motor to drive a tractor adapted for receiving a wheelchair.

U.S. Pat. Nos. 3,964,768; 3,955,639; and 1,164,863 present the general concept of motorized wheelchairs. U.S. Pat. Nos. 3,888,324 and 3,671,071 refer to electric vehicles such as are commonly used as golf carts.

In addition, there are currently various motorized wheelchairs on the market such as the Voyager series made by Voyager, Inc. of South Bend, Indiana; the Elektra series made by Sherry Products of Hermosa Beach, California and the Stephen Motorchair made by Stephen Motorchair Company of Siloam Springs, Arizona. These devices possess one or more of the disadvantages discussed above.

DISCLOSURE OF INVENTION

In light of the foregoing, it is an object of the instant invention to provide a motorized wheelchair which is both rugged in construction for outdoor use and is highly maneuverable for use indoors.

Another object of the instant invention is to provide a motorized wheelchair which has sufficient power and range to accommodate extended use under heavy power load conditions.

A still further object of the instant invention is to provide a motorized wheelchair which has a comfortable seating arrangement.

Still another object of the instant invention is to provide a motorized wheelchair which can easily surmount obstacles encountered out-of-doors such as curbs, moderate grades, or debris.

Yet another object of the instant invention is to provide a motorized wheelchair which has a highly reliable steering and speed control mechanism which require only low effort to operate and is inexpensive to manufacture and maintain.

The foregoing and other objects of the invention which will become apparent as the detailed description proceeds are achieved by: a motorized wheelchair comprising: a pivotally mounted rear wheel for steering the wheelchair; a pair of front wheels which transmit driving force for locomotion; a chassis interconnected between said front and rear wheels; a power source for effecting locomotion maintained upon said chassis; a means for steering having an electromechanical activation; a body fitting over said chassis; and a seat for an occupant.

BRIEF DESCRIPTION OF DRAWINGS

For a complete understanding of the objects, techniques, and structure of the invention, reference should be had to the following detailed description and accompanying drawings, wherein.

BEST MODE FOR CARRYING OUT THE INVENTION

Figure 9:
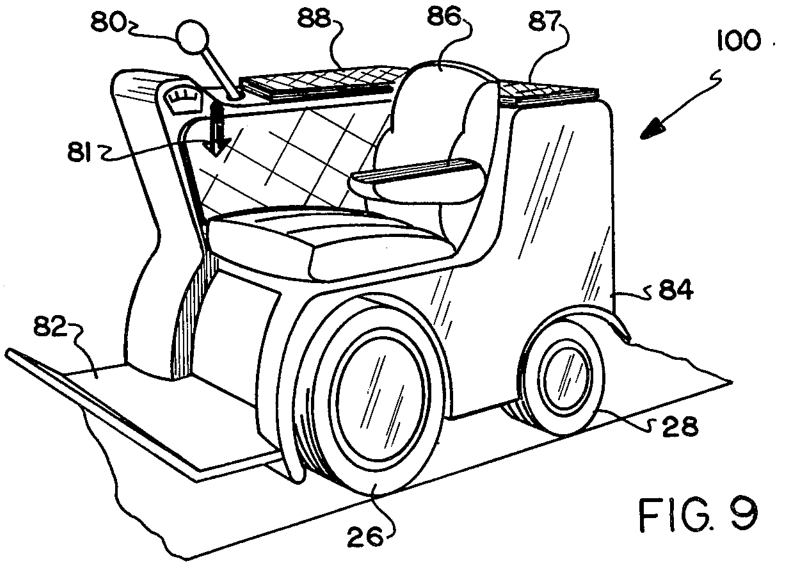
FIG. 9 is an overall view of the motorized wheelchair of the invention as it appears fully assembled.

With reference now to FIG. 9, it can be seen that a wheelchair, consistent with the teachings of this invention, is designated generally by the number 100. The user positions himself in the padded seat 86, which is made wide enough to accommodate a person of robust build. The armrest 88 contains a control handle 80, which, as described more fully hereinafter, is used to control both the right/left and forward/reverse direction of the wheelchair. Also included is a gear shift lever 81 which is interconnected with a transmission, to be discussed later, to select one of five speeds.

The body 84 of the wheelchair 100 encases the internal drive and steering assemblies and protects them from damage. It also isolates the user and others from possible contact with the electrical and mechanical structures to be discussed hereinafter.

Footrest 82 may be an integral part of body 84 or may be a separate, add-on piece. In any event, it provides a convenient resting place for the user's feet and also provides for ease of maneuverability to and from the wheelchair.

The driving wheels 26 of the wheelchair 100 are located in the front and are of much larger diameter than the rear wheels 28, the latter providing steering means for the wheelchair 100. The larger front wheels enable wheelchair 100 to overcome small obstacles commonly encountered in operation out-of-doors, such as curbs, chuckholes, debris and the like.

The diameter of the drive wheels 26 may be between 12" and 24" with 18" being preferred. The steering wheels 28 are of a diameter between 6" and 18" with 13" being preferred. Drive wheels 26 preferably utilize pneumatic floatation tires and the rear wheels 28 preferably utilize pneumatic tires.

The body 84 is of rugged construction to enable use of the wheelchair 100 out-of-doors in adverse weather conditions. Construction may be of metal such as steel or aluminum and the like, or may be of fiberglass, or of a plastic such as ABS.

It will be appreciated that the armrest 88 may be located on either the left or the right side of the wheelchair 100 according to user preference. Storage batteries (not shown) which supply power for steering and locomotion are positioned behind seat 86. Access is obtained through a hinged lid 87.

Figure 1:
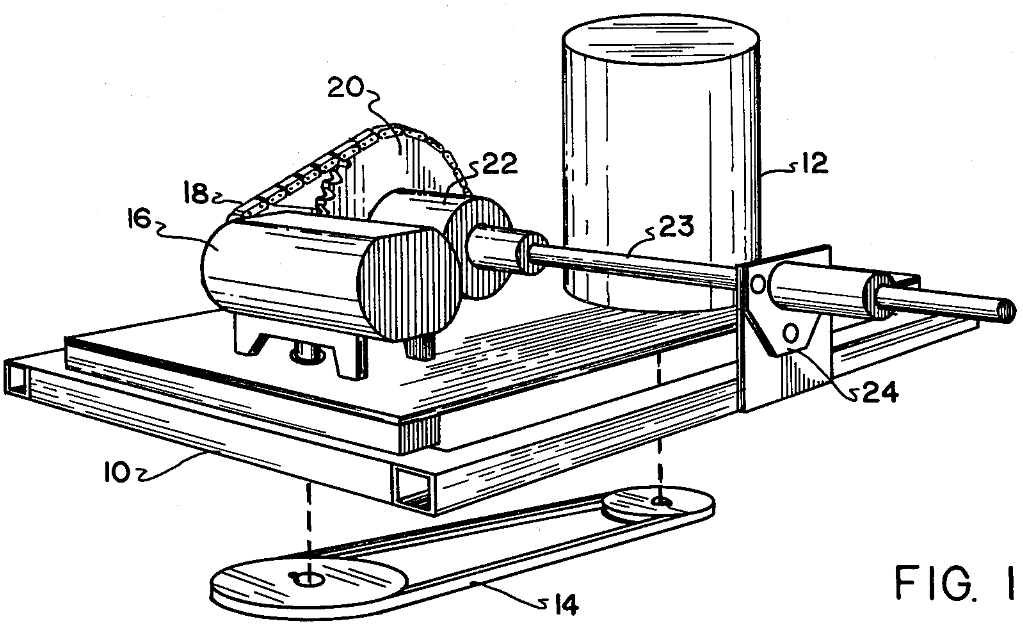
FIG. 1 is an isometric view of the power drive assembly of the instant invention.

Turning now to FIG. 1, it is noted that the drive assembly of the instant invention is mounted on the main frame 10. A DC motor 12, powered by batteries (not shown), drives a five-speed transmission 16 through a 5/8" V-belt 14. The speed or gearing of the transmission is selected through the gear shift lever 81 by means of standard linkage. Transmission 16 in turn drives a sprocket 20 through a chain 18, the sprocket 20 in turn driving a differential 22, which is of conventional automotive type design. A bearing assembly 24 secures a rod 23 firmly to main frame 10. Rod 23 is connected directly to drive wheels 26, which power the wheelchair. The horsepower output of DC motor 12 may vary from 1 to 3 hp. with 2 hp. being the most often preferred. Speeds of up to 9 mph may be attained with the proper gearing and using the 2 hp motor. As will be discussed later, the motor 12 may be selectively driven by 12 or 24 volts, effectively providing the chair 100 with 10 selectable speeds.

Figure 2:
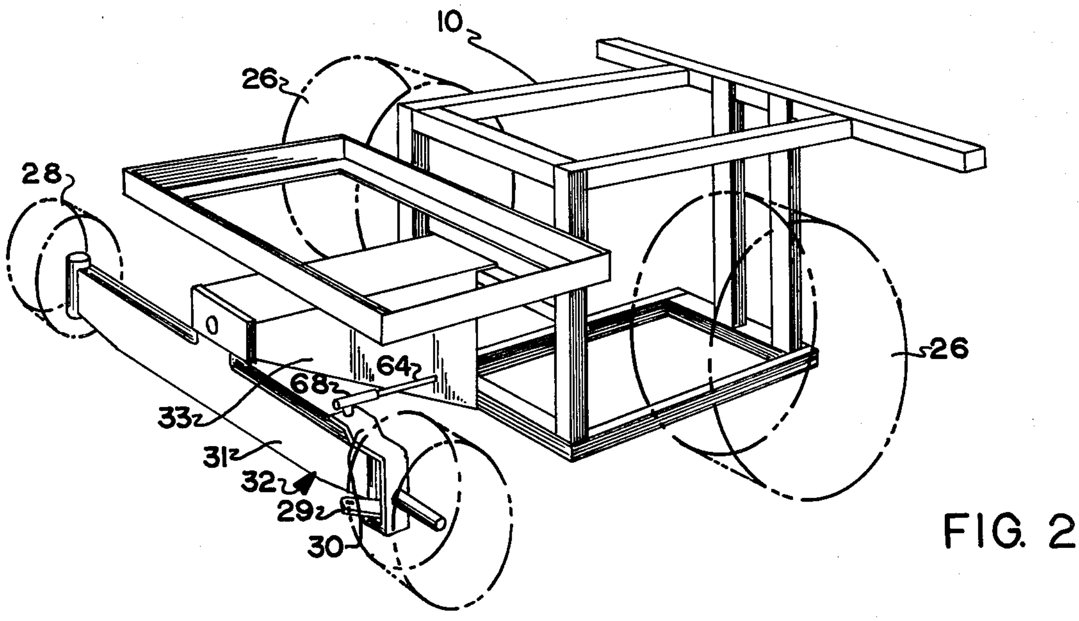
FIG. 2 is an isometric view of the chassis of the instant invention.

An overall view of the chassis layout can be seen in FIG. 2, as can a detailed view of the axle assembly 32 and a spindle assembly 30. Steering is effected by movement of a lower steering control rod 64, which in turn moves a tie rod end 68 connected to the spindle assembly 30 in somewhat standard fashion. As illustrated, the axle assembly basically includes a metal beam 31 fixedly attached to a protruding brace member 33. Of course, various structures would satisfy this fundamental axle concept. As is also shown, the spindle assembly 30 includes a tie rod connector 29 for interconnecting, by means of a tie rod, the tire wheels 28.

It will be appreciated that chassis pieces and the main frame 10 may be constructed of any suitable material such as steel, aluminum, high strength plastic, and the like.

Figure 3:
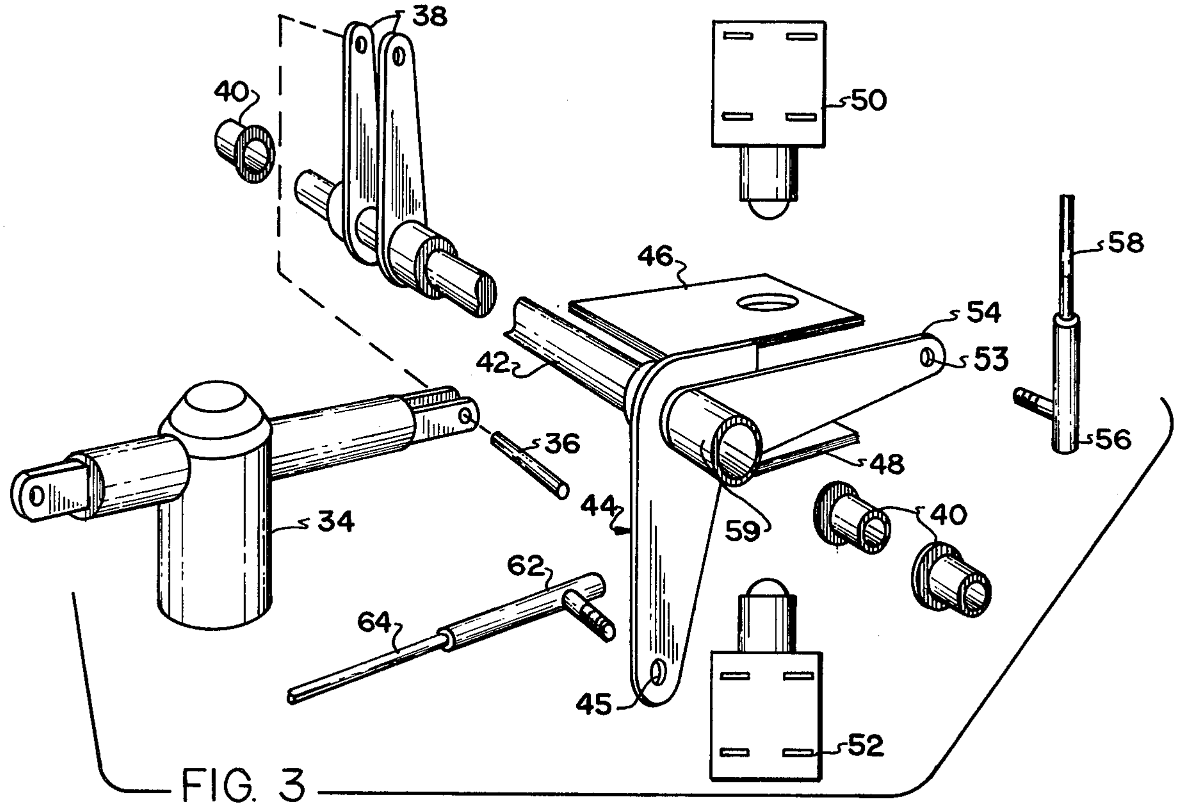
FIG. 3 is an exploded view of the steering and direction control assembly.

An exploded view of the steering assembly is seen in FIG. 3. A pivot shaft 42 is secured by bushings 40 to the main frame 10 and may freely rotate therein. Located on the pivot shaft 42 are a plurality of shaft pivot links. Actuator shaft links 38 provide a mechanical connection between the pivot shaft 42 and an electro-mechanical actuator 34, the latter being described more fully hereinbelow. Shaft pivot plate assembly 44 provides a connection between the pivot shaft 42 and the lower steering control rod 64 by means of a tie rod end 62. Thus, rotational movement of pivot shaft 42 causes corresponding axial movement of the lower steering control rods 64.

A pair of microswitches 50, 52 are secured to the shaft pivot plate assembly 44 by means of switch mounts 46 and 48. The purpose of these microswitches will also be described more fully in detail shortly. Additionally secured to the pivot shaft 42, is the toggle switch assembly 54, which rotates independently of the pivot shaft 42 and can be seen in greater detail in FIGS. 5A and 5B. The bushing 59 affords rotational securement of the toggle switch assembly 54 on the pivot shaft 42 and may contain one of a variety of conventional bearing arrangements.

Figure 5A:
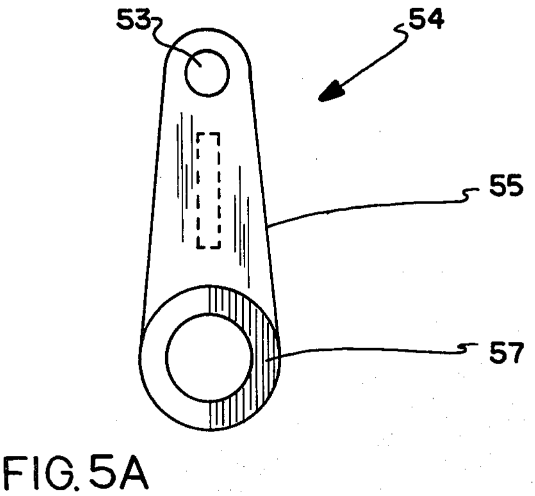
FIGS. 5*a* and 5*b* are two views of the switch toggle assembly.
Figure 5B:
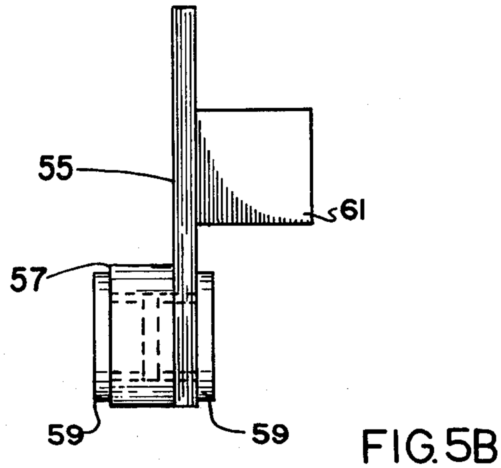

As shown in FIGS. 5A and 5B, the toggle switch assembly 54 includes a collar 57 providing securement of the steering control pivot link 55 to the bushing 59. Extending normally from the steering control pivot link 55 is the switch engagement plate 61. The tie rod connection hole 53 links the toggle switch assembly 54 to the tie rod end 56.

Figure 6A:
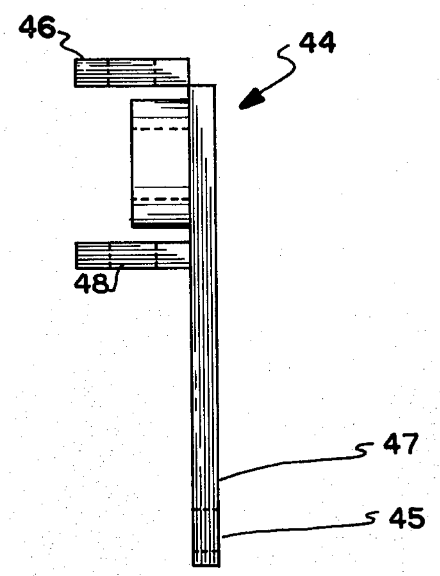
FIGS. 6*a* and 6*b* are two views of the power steering switch pivot.
Figure 6B:
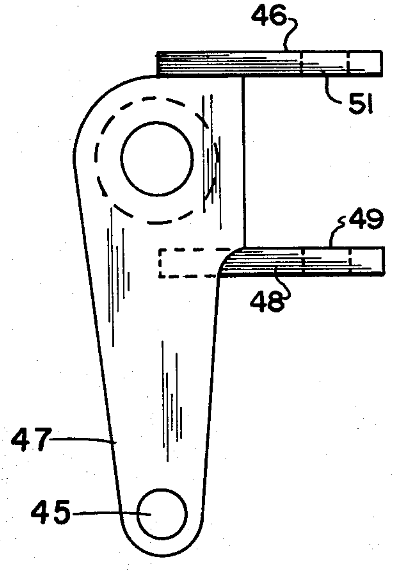

FIGS. 6A and 6B show a detailed sketch of a shaft pivot plate assembly 44. As noted above, the microswitches 50 and 52 are received by the switch mounts 46 and 48. Retention holes 49, 51 receive the microswitches which are secured therein by conventional means. Connection hole 45 connects to tie rod end 62 of the lower steering control rod 64.

Figure 4:
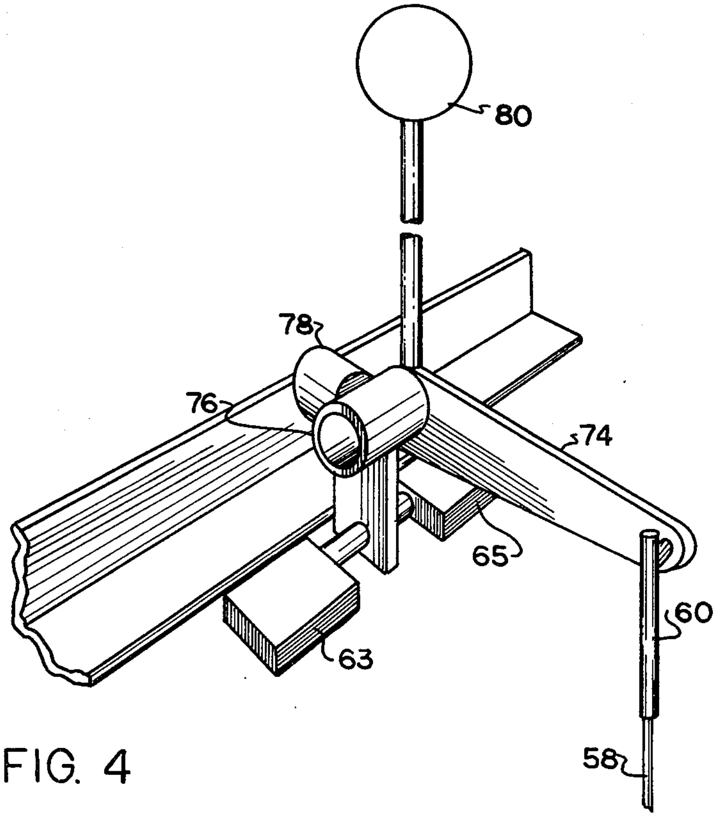
FIG. 4 is an isometric view of the joy stick control rod of the invention.

Operation of the control handle 80 can be seen in FIG. 4. Lateral movement of the control handle or joy stick 80 causes corresponding clockwise or counterclockwise motion of the control handle pivot link 74 which in turn causes movement of tie rod end 60 and upper steering control rod 58. This motion correspondingly translates into an up or down motion of the toggles switch assembly 54. Movement of handle 80 forward or rearward causes depression of a microswitch 63 or 65, respectively, which in turn activates D.C. motor 12. Microswitches 63 and 65 are of opposite polarity, such that activation of switch 63 causes motor 12 to propel the wheel chair forward whereas activation of switch 65 has the opposite effect. Control handle 80 is rotatably secured to frame 10 by conventional, well known means such as for example bushings 76 and 78 which allow movement of handle 80 either forward or rearward or laterally left upright.

Figure 10:
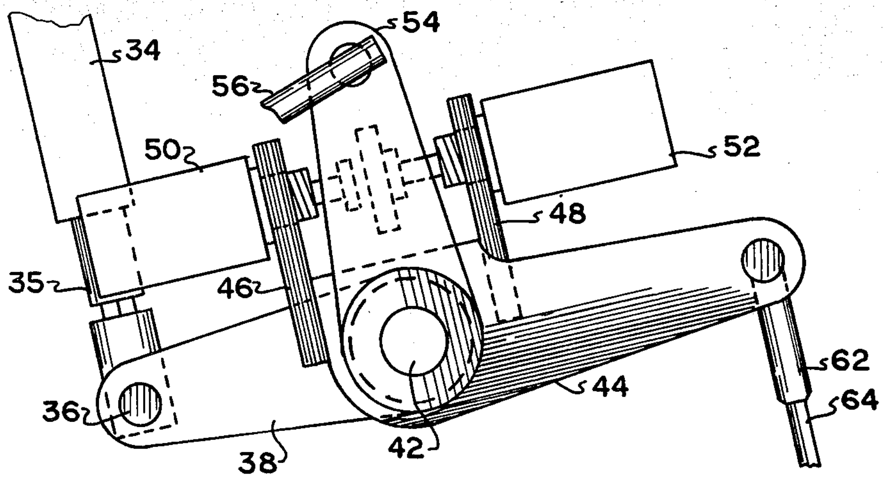
FIG. 10 is a side view showing in detail how the power steering mechanism operates.

Turning now to FIG. 10, the operation of the steering means will be described in detail. Here it is seen that movement of tie rod end 56 which is connected to toggle switch assembly 54 causes switch engagement plate 61 to contact and depress button 45 of microswitch 52 located in the switch mount 48. Microswitch 52 is thereby activated. Activation of said microswitch energizes the electro-mechanical actuator 34 in such a way that the piston 35, as shown by the arrows in FIG. 10, is made to withdraw into the actuator 34. By virtue of the linkage of the piston 35 with the actuator shaft pivot links 38 through actuator anchor pin 36, pivot shaft 42 is made to rotate in a clockwise direction. This in turn causes a corresponding rotation in the shaft pivot plate assembly 44 thereby forcing the lower steering control rods 64 in outward direction. This orients the rear wheels 28 so that the wheelchair moves to the right.

As the pivot shaft 42 moves in a clockwise direction, it also causes reorientation of the microswitches 50 and 52 by virtue of their securement to the switch means 46 and 48. Eventually, enough rotation of shaft pivot plate assembly 44 occurs such that button 45 is no longer depressed by the switch engagement plate 61, at which time microswitch 52 is deactivated and electro-mechanical actuator 34 is deenergized. Thus, it can be seen that orientation of the steering wheels 28 is effected by the positioning of the control handle 80.

Should the control handle 80 be turned to the left, toggle switch assembly 54 is rotated in the counterclockwise direction thereby engaging the button on microswitch 50 by means of contact with the switch engagement plate 61. Microswitch 50 is of opposite polarity to that microswitch 52, thus activation of the former energizes electro-mechanical actuator 34 in such a way as to cause piston 35 to extend outward, rather than inward. This in turn produces an effect opposite to that of activation of microswitch 52, in that the activator shaft pivot link 38 causes pivot shaft 42 to move in a counter-clockwise direction, thus positioning lower steering control rod 64 in a manner to effect orientation of the steering wheels 20 to turn wheelchair 100 to the left.

Again, sufficient rotation of the pivot shaft 42 causes disengagement of microswitch 50 from switch engagement plate 61, such that further movement of piston 35 in the outward direction does not occur.

It will be further appreciated that buttons 45 and 47 are spring loaded such that the switch engagement plate 61 is maintained at an angle perpendicular to said buttons unless further pressure is applied to control handle 80. This angle is of course translated into a corresponding angle of the control handle 80 by virtue of the interconnection described hereinabove. The user is thus able to determine the instantaneous orientation of the steering wheels 28 merely by observation of the position of the control handle 80. That is, the control handle acts in a manner similar to the joy stick in an airplane such that, for example, the further the control handle 80 is tilted to the right, the further the steering wheels 28 are oriented to drive the wheelchair to the right.

The electro-mechanical actuator 34 may be of conventional design and is operated by 12 volts DC power obtained from conventional automobile or marine storage batteries. The embodiment described herein uses the Duff-Norton Mini-Pack electro-mechanical actuator having a built-in safety clutch. A detailed description of this actuator is given in U.S. Pat. Nos. 3,559,499; 3,587,796; 3,704,765. Essentially this actuator consists of a DC motor in threadable connection with a gear and pinion having a 20:1 ratio and a lead screw. Activation of the DC motor is translated into rotational movement of the lead screw which in turn causes piston 35 to either extend or withdraw into the body of the actuator 34 depending upon the rotational direction of the DC motor. A friction disc clutch (not shown) prevents damage to the piston 35 when the DC motor is activated and the piston is in its fully retracted or fully extended position.

Figure 7:
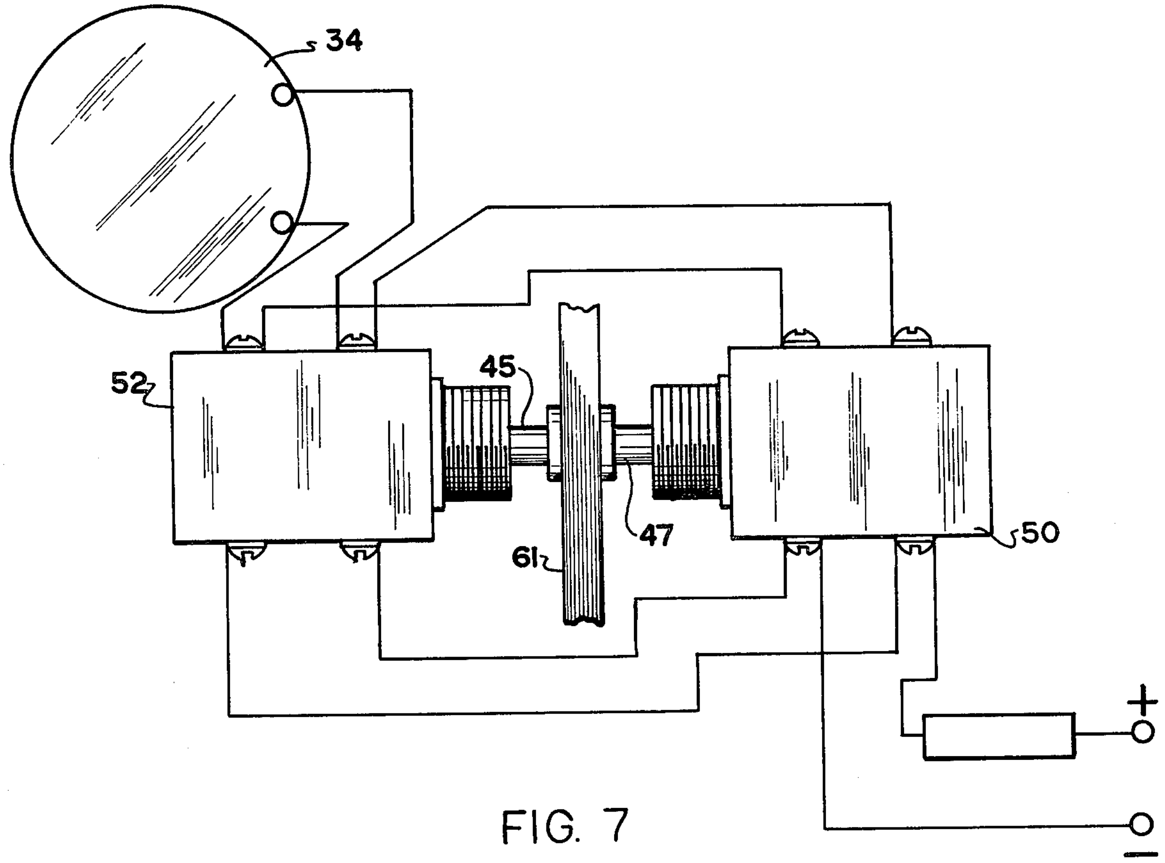
FIG. 7 is the electrical diagram showing the steering switch wiring.

Although the Duff-Norton Mini-Pack electro-mechanical actuator is preferred, it will be appreciated that any other conventional electro-mechanical actuator may be utilized provided it has a stroke of about 3" . A duty cycle of about 600 inches per hour, a speed of approximately 10 inches per minute and a load capacity of about 500 pounds. The electrical wiring layout of the microswitches 50 and 52 and the electro-mechanical actuator 34 can be seen with reference to FIG. 7.

Figure 8:
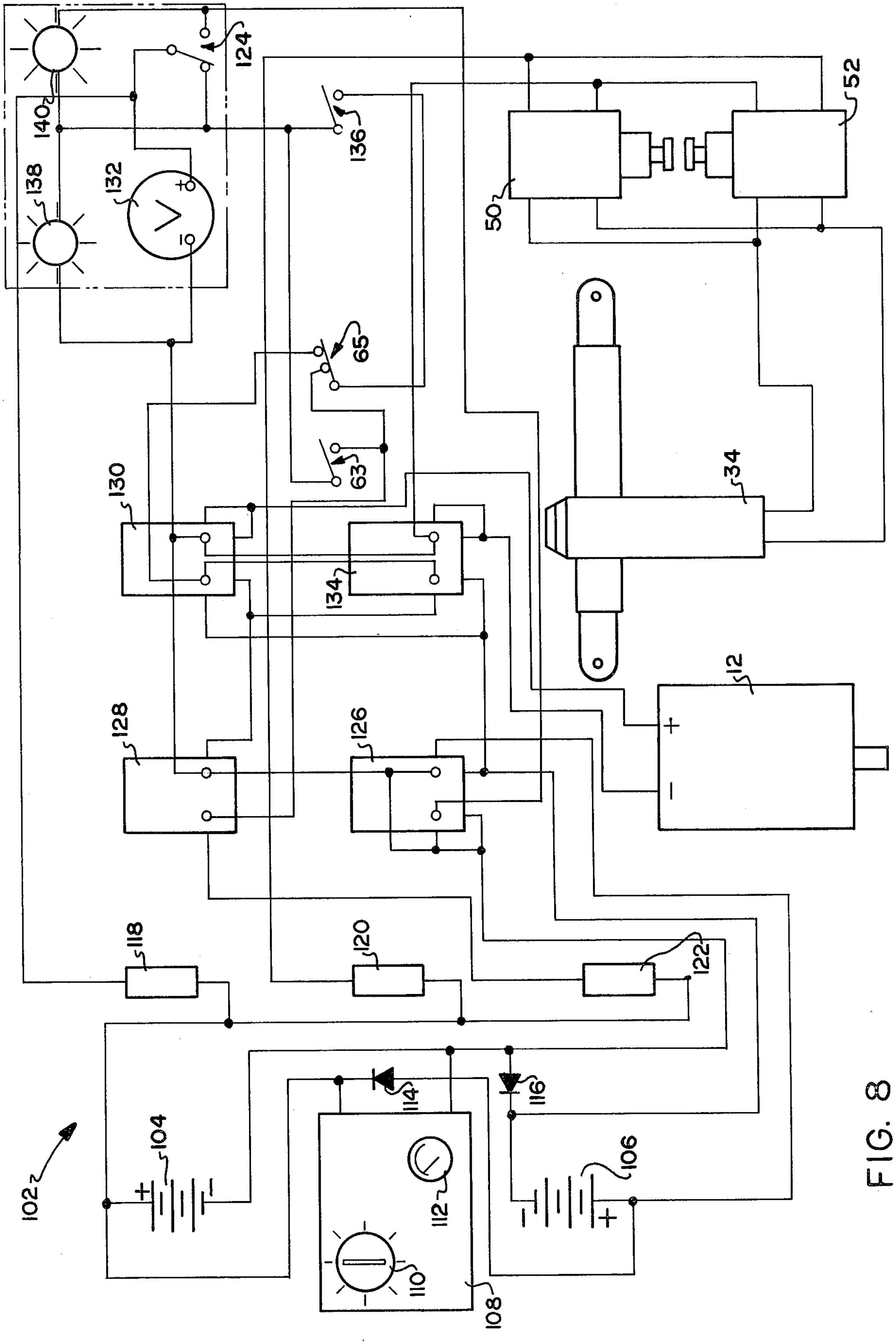
FIG. 8 is a wiring diagram of the forward and reverse direction electrical layout.

With reference now to FIG. 8, it can be seen that the control circuit of the invention is designated generally by the numeral 102. The invention includes batteries 104, 106, which are preferably twelve volts each, being of the heavy duty marine type. Included in interconnection with the batteries 104, 106 is a charger 108, adapted for receiving 110 volt wall current and rectifying the same to be an appropriate DC charging voltage for the batteries. The charger 108 includes a timer 110 for selecting a charging time and a meter 112 indicating the charging rate. Diodes 114, 116 are interposed between the batteries 104, 106 and the charger 108 to act as blocking diodes to prevent damage to the charger.

Also included as a portion of the circuit 102 are three fuses or breakers 118–122. The first fuse 118 serves to protect the on/off switch 124 and the voltage selection portion of the circuitry to be discussed hereinafter. The fuse 120 protects the steering circuitry and control means comprising switches 50, 52 and actuator 34. Finally, the fuse 122 serves to protect the circuitry controlling the forward and reverse operation of the motor 12.

With more detailed reference now to the circuit of FIG. 8, it can be seen that a switch 124 is provided for turning the power to the motor 12 "on," for selecting 12 volt or 24 volt interconnection to the motor 12, and for turning the system "off". Preferably, this switch 124 is maintained on the armrest of the chair 100, in close positional relationship to the joy stick 80. As illustrated in the drawing of FIG. 8, switch 124 is activated to interconnect 12 volts to the motor 12, the other contact being adapted for connecting 24 volts thereto. A central position between the two contacts is the "off" position.

The switch 63, controlled by the joy stick 80 as discussed above, causes the chair 100 to move forwardly. This is achieved by passage of current from the battery 104, through the fuse 122 to the relay 128. The relay 128 is preferably of the single pole single throw type, and, when appropriately actuated by the switch 63, passes current through the normally closed contacts of the relay 130, to the positive input of the motor 12 to drive the motor forwardly. When the reverse switch 65 is actuated by the joy stick, current passes through relay 128, to the relay 134, of the double pole single throw type, to pass the current to the negative input of the motor 12. As can be seen, the switch 65 opens the normally closed contacts of the relay 130, such relay closing the normally open contacts of the relay 134.

As discussed hereinabove, the transmission incorporated in the instant invention is a five-speed transmission. It is desired that one only be able to select reverse movement of the chair 100 in the lower two gear ranges to the transmission. Accordingly, a switch 136 is provided as a reverse lock-out switch to prevent reverse operation in other but the lower two gears. Switch 136 is operatively connected to the gear lever 81 or directly to the transmission to achieve this function. As shown in the drawing, the switch 136 indicates that the transmission is in one of the higher gears.

To select between a 12 volt and 24 volt operation, the relay 126 is provided. This relay, preferably of the double pole single throw type, is activated by the switch 124 when placed in the contacting position opposite that shown in the drawing. In this situation, the batteries 104, 106 are connected in series via the fuse 118, switch 124 and relay 126. The positive output of the battery 106 then passes through the relay 126 to the relay 128 to provide 24 volts to the motor 12 for forward and reverse operation as discussed above.

As can be seen, there are provided lamps 138, 140 interconnected with the switch 124, to mutually exclusively indicate that the chair 100 is being operated as a 12 volt or 24 volt system. There is also provided a voltage meter 132 interconnected with the switch 124 to indicate the voltage capacity of the battery 104, in 12 volt operation, and the series value of the batteries 104, 106 in 24 volts operation. Preferably, the lamps 138, 140 and the voltage meter 132 are provided on the armrest in close juxtaposition to the joy stick 80. Similarly, the switch 124 is so positioned.

The material of construction of the various parts described herein is commonly metal such as steel due to strength requirements and the necessity for the welding and machining of various parts. This does not however exclude the use of various plastic or composite materials recently introduced in the art which may be substituted for certain parts with improvements in strength and weight.

It is to be understood that appropriate bearings, coupling devices, and the like, all of well known design, will be applied at appropriate places during construction of this invention, as is well known in the mechanical art.

Thus it can be seen that the objects of the invention have been satisfied by the structure presented hereinabove. The concept of the invention may be applied to wheelchairs or other motorized devices utilizing an electrical power source. Additionally, selected portions of the invention may be applied to existing devices to provide a corresponding improvement in operation. While in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be had to the appended claims.

What is claimed is:

1. A motorized wheelchair comprising:
   - a pivotally mounted rear wheel for altering the wheelchair;
   - a pair of front wheels which transmit driving force for locomotion;
   - a chassis interconnected between said front and rear wheels;
   - a power source for effecting locomotion maintained upon said chassis;
   - a means for steering having an electro-mechanical activator and a pivot shaft having attached thereto a plurality of shaft pivot links, said pivot links rotating in unison with said pivot shaft;
   - a body fitting over said chassis;
   - a seat for an occupant; and wherein said means for steering further comprises:
   - a pair of microswitches secured upon a first said shaft pivot link such that activation buttons of said microswitches face each other;
   - a steering control pivot link having a switch engagement plate, the latter being disposed between said facing activation buttons of said microswitches and wherein rotation of said steering control pivot link effects activation of one of two said microswitches;
   - second and third said shaft pivot links in mechanical linkage with said electromechanical actuator and wherein said electromechanical actuator is actuated by either of said microswitches;
   - a steering control rod secured to said first shaft pivot link; and
   - a joy stick control mechanically linked to said steering control pivot link.

2. A motorized wheelchair according to claim 1, wherein said front wheels consist of tires having a diameter of greater than 12 inches and less than 24 inches.

3. A motorized wheelchair according to claim 2, wherein two said rear wheels are tandemly rotatable to steer said wheelchair by means of a steering control rod.

4. A motorized wheelchair according to claim 1, wherein activation of said electromechanical actuator causes rotation of said pivot shaft and said shaft pivot links in a direction dependent on which of two said microswitches have been activated.

5. A motorized wheelchair according to claim 4, wherein said pivot shaft and said shaft pivot links are rotated until reorientation of said microswitch secured to said first shaft pivot link causes deactivation of said activated microswitch by reason of disengagement from said switch engagement plate.

6. A motorized wheelchair according to claim 5, wherein said steering control rod effects rotation of said rear wheels by reason of mechanical linkage with said first shaft pivot link.

7. A motorized wheelchair according to claim 1, wherein said power source comprises a pair of batteries selectably interconnected with a motor between series and parallel interconnection.

8. A motorized wheel chair according to claim 7, which further includes switch means interposed between said batteries and said motor for selectably controlling the rotational direction of said motor.

9. A motorized wheelchair according to claim 8, wherein said means for steering comprises a joy stick, said joy stick further being interconnected with said switch means for controlling the rotational direction of said motor.

* * * * *